US008855110B2

(12) United States Patent
Huang et al.

(10) Patent No.: US 8,855,110 B2
(45) Date of Patent: Oct. 7, 2014

(54) PERSONAL VIDEO RECORDER HAVING IMPROVED DATA ACCESS AND METHOD THEREOF

(75) Inventors: Chien-Chung Huang, San Jose, CA (US); Freimann Felix, Sunnyvale, CA (US); Yuan-Liang Cheng, San Jose, CA (US); Tung-Hao Huang, Tai-Chung (TW)

(73) Assignee: Mediatek USA Inc., San Jose, CA (US)

( * ) Notice: Subject to any disclaimer, the term of this patent is extended or adjusted under 35 U.S.C. 154(b) by 1432 days.

(21) Appl. No.: 11/469,897

(22) Filed: Sep. 4, 2006

(65) Prior Publication Data
US 2008/0060044 A1 Mar. 6, 2008

(51) Int. Cl.
*H04L 12/50* (2006.01)
*H04N 21/4147* (2011.01)
*H04N 5/76* (2006.01)
*H04N 9/804* (2006.01)
*H04N 9/82* (2006.01)
*H04N 5/781* (2006.01)

(52) U.S. Cl.
CPC ............. *H04N 5/76* (2013.01); *H04N 21/4147* (2013.01); *H04N 9/8042* (2013.01); *H04N 9/8205* (2013.01); *H04N 5/781* (2013.01)
USPC ............ 370/363; 370/362; 370/368; 370/371

(58) Field of Classification Search
USPC ............ 370/229, 230, 231, 235; 725/134, 58, 725/142
See application file for complete search history.

(56) References Cited

U.S. PATENT DOCUMENTS

| | | | |
|---|---|---|---|
| 6,178,242 B1 | 1/2001 | Tsuria | |
| 6,466,670 B1 | 10/2002 | Tsuria et al. | |
| 6,587,561 B1 | 7/2003 | Sered et al. | |
| 6,594,442 B1 | 7/2003 | Kageyama | |
| 6,629,243 B1 | 9/2003 | Kleinman et al. | |
| 6,668,326 B1 | 12/2003 | Sella et al. | |
| 6,772,435 B1 | 8/2004 | Thexton et al. | |
| 6,792,195 B2 | 9/2004 | Barton | |
| 2002/0018463 A1* | 2/2002 | Rabenko | 370/352 |
| 2002/0095689 A1* | 7/2002 | Novak | 725/151 |
| 2002/0105905 A1* | 8/2002 | Boyle et al. | 370/229 |
| 2002/0123928 A1* | 9/2002 | Eldering et al. | 705/14 |
| 2004/0033053 A1* | 2/2004 | Chen et al. | 386/83 |
| 2004/0098709 A1* | 5/2004 | Kyo | 717/140 |
| 2004/0141614 A1* | 7/2004 | Choi et al. | 380/200 |

(Continued)

FOREIGN PATENT DOCUMENTS

| | | |
|---|---|---|
| TW | 412729 | 11/2000 |
| TW | 200506841 | 2/2005 |
| TW | I238990 | 9/2005 |
| TW | I253076 | 4/2006 |

*Primary Examiner* — Anez Ebrahim
(74) *Attorney, Agent, or Firm* — Winston Hsu; Scott Margo

(57) ABSTRACT

A personal video recorder (PVR) system includes a processing unit, a system memory coupled to the processing unit by a system memory bus, and an insertion module being coupled to the processing unit for inserting a packet into a PVR bit stream according to packet information. During a packet insertion operation, the processing unit is for reading data from the system memory, processing the data to generate the packet insertion information, and directly transferring the packet insertion information to the insertion module. By directly transferring the packet insertion information generated by the processing unit to the insertion module, memory bandwidth requirements of the system memory are reduced, and data access of the system memory is improved.

4 Claims, 3 Drawing Sheets

(56) References Cited

U.S. PATENT DOCUMENTS

| | | | |
|---|---|---|---|
| 2004/0158634 A1* | 8/2004 | Saito et al. | 709/225 |
| 2005/0053159 A1* | 3/2005 | Sugimoto | 375/240.26 |
| 2006/0098950 A1* | 5/2006 | Naruse et al. | 386/98 |
| 2008/0025700 A1* | 1/2008 | Ito et al. | 386/98 |

* cited by examiner

PERSONAL VIDEO RECORDER HAVING IMPROVED DATA ACCESS AND METHOD THEREOF

BACKGROUND OF INVENTION

1. Field of the Invention

The invention relates to personal video recorders, and more particularly, to a personal video recorder having improved data access.

2. Description of the Prior Art

A personal video recorder (PVR) is a generic term referring to a device that is similar to a video cassette recorder (VCR) but records television data utilizing a digital format as opposed to an analog format such as used by a VCR. A PVR can also be referred to as a hard disk recorder (HDR), a digital video recorder (DVR), a personal video station (PVS), or a personal TV receiver (PTR). While VCRs utilize analog tapes to record and play programs broadcast over television, PVRs encode video data in digital formats such as Moving Pictures Expert Group (MPEG)-1 or MPEG-2 and store the data on a magnetic medium such as a hard drive. PVRs need to provide similar functionality as VCRs (recording, playback, fast forwarding, rewinding, pausing) and also include the ability to instantly jump to any part of a television program without having to rewind or fast forward the data stream. A benefit of the PVR system is that these functions can be applied to a television program that is currently being received. That is, from the respect of a user, the functions of the PVR are available even while watching a live television broadcast.

A PVR is essentially made up of two elements including a device that stores its hardware elements, such as the hard disk drive, power supply and buses, and software that may access a subscription service for providing programming information and provides the ability to encode and decode data streams. Additionally, when implemented as a set-top box, the PVR receives a transport stream, e.g. a MPEG transport stream, as an input signal. In this situation, because the transport stream has crossed a network of some kind, there may be errors in the input signal. Furthermore, packets of the input signal received from the transport stream may arrive in any order and may be reduced in size due to the properties of the network. For example, wireless networks, cable based networks, optical networks, and asynchronous transfer mode (ATM) networks all have different packet size requirements.

In a PVR system, packet insertion is sometimes needed to provide extra control and to allow the PVR system to provide extra services/functions. For example, in order to protect intellectual property of content during transport, condition access (CA) is used to provide content security. The basic concept of CA involves using a secret key exchange method between two sides, a service provider and a user, and then scrambling the content with a set of secret keys. As an example of a situation requiring packet insertion, the PVR system may need to insert control words to carry information regarding key exchange.

FIG. 1 shows a block diagram of a typical architecture 100 used in a PVR for packet insertion. As shown in FIG. 1, the typical architecture 100 includes a central processing unit (CPU) 102, a system memory 104, an insertion module 106, a synchronous random access memory (SRAM) 108, and a PVR module 110. The SRAM 108 is used to store a register file, and insertion information typically originates from the CPU 102 parsing either an incoming bit stream IN or from some information generated by the CPU 102. The CPU 102 then processes data stored and read from the system memory 104, and further stores insertion data in the system memory 104. The insertion module 106 uses a link-list to collect and organize the insertion data in the system memory 104, and a direct memory access (DMA) operation is performed to move data between the insertion module 106 and the system memory 104. However, this typical architecture 100 shown in FIG. 1 suffers from a problem that a large amount of bandwidth between the CPU 102 and the system memory 104 is required. This requirement is due to the CPU 102 needing to both retrieve from and store data to the system memory 104.

SUMMARY OF INVENTION

One objective of the claimed invention is therefore to provide, a method of packet insertion to reduce bandwidth requirements between a processing unit and a system memory to thereby improve data access of the system memory and solve the above-mentioned problem.

According to an exemplary embodiment of the claimed invention, a method of packet insertion in a personal video recorder (PVR) is disclosed. The method comprises the following steps: reading data from a system memory; processing the data read from the system memory; generating packet insertion information; directly transferring the packet insertion information to an insertion module; and utilizing the insertion module to insert a packet into a PVR bit stream.

According to another exemplary embodiment of the claimed invention, a personal video recorder (PVR) is disclosed comprising a processing unit; a system memory coupled to the processing unit by a system memory bus; and an insertion module being coupled to the processing unit for inserting a packet into a PVR bit stream according to packet information; wherein during a packet insertion operation, the processing unit is for reading data from the system memory, processing the data to generate the packet insertion information; and directly transferring the packet insertion information to the insertion module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
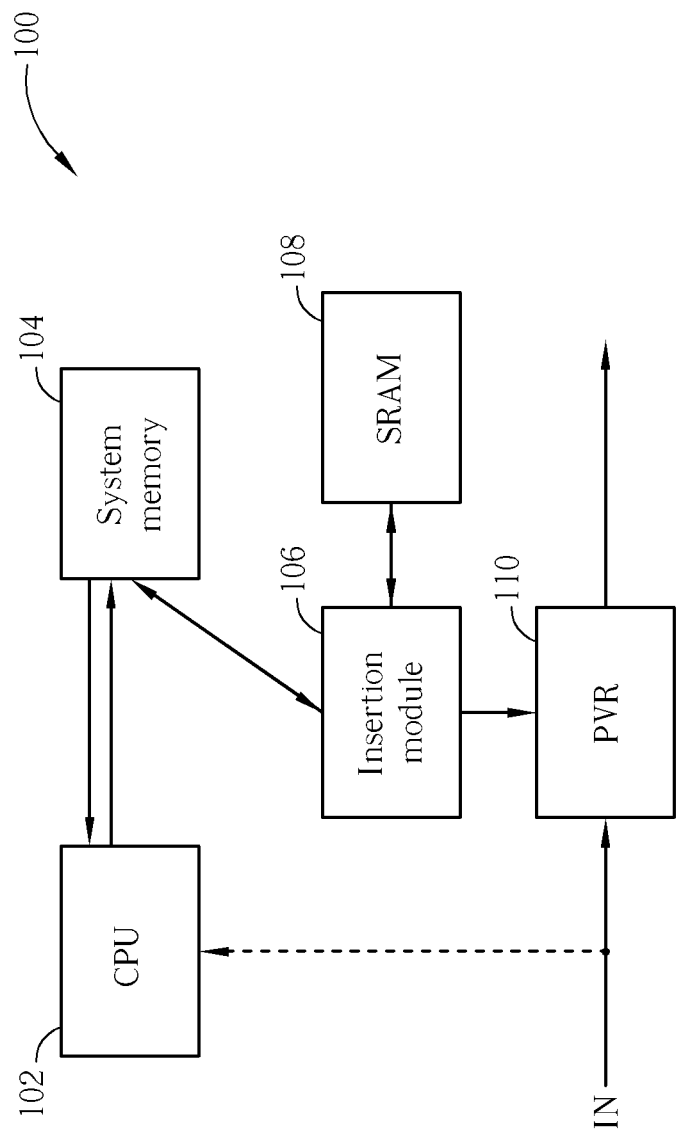
FIG. 1 is a block diagram of a typical architecture used in a personal video recorder for packet insertion.
Figure 2:
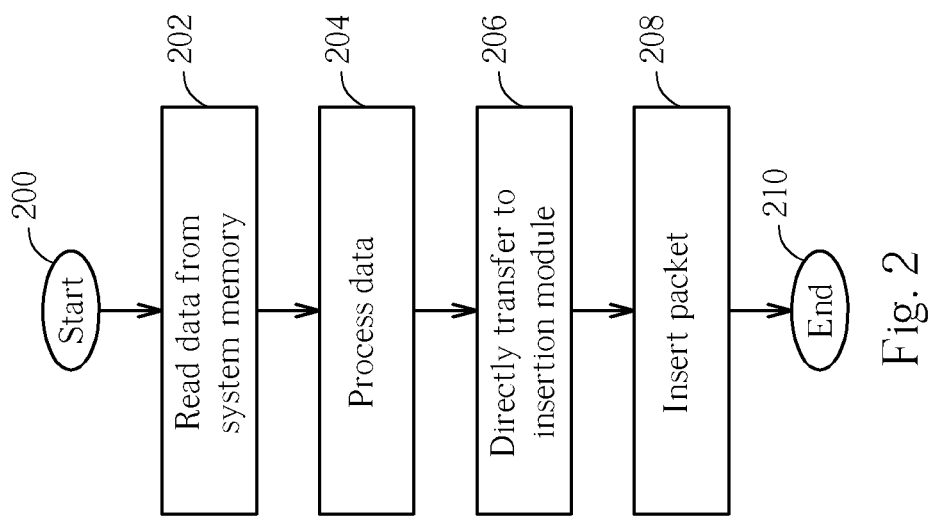
FIG. 2 is a flowchart describing operations of packet insertion according to an exemplary embodiment of the present invention.

FIG. 2 shows a flowchart describing operations of packet insertion in personal video recorder (PVR) according to an exemplary embodiment of the present invention. Provided that substantially the same result is achieved, the steps of the flowchart shown in FIG. 2 need not be performed in the exact order shown and need not be contiguous, that is, other steps can be intermediate. In this embodiment, the flowchart of FIG. 2 contains the following steps:

Step 200: Begin packet insertion operations. For example, packet insertion operations may be required if a PVR needs to insert control words, e.g. control words for carrying information, e.g. one or more key values, regarding key exchange.

The start of packet insertion operations, as an example, can be detected by parsing an incoming bit stream IN, or be triggered by a timer or an interrupt from a central processing unit (CPU).

Step 202: Read data from a system memory. Data related to packet insertion is read from the system memory through a system memory bus.

Step 204: Process the data read from the system memory in Step 202 to thereby generate packet insertion information. In this step, a central processing unit (CPU), an application specific integrated circuit (ASIC), or an alternative processing unit is used to process the data read in step 202 and thereby generate the packet insertion information.

Step 206: Directly transfer the packet insertion information generated in step 204 to an insertion module without storing the packet insertion information in the system memory.

Step 208: Insert a packet into the PVR bit stream according to the packet insertion information.

Step 210: End packet insertion operations.

By transferring the packet insertion information directly to the insertion module in step 206, no memory transaction is required to be performed on the system memory bus. Therefore, memory bandwidth requirements of the system memory are reduced according to the present invention. Additionally, it is not necessary to utilize a linked list to organize packet information in the system memory. Instead, the packet information can be directly transferred to the insertion module. In this way, the insertion module receives the required packet insertion information and does not need to perform a direct memory access (DMA) operation according to a linked list in order to retrieve data from the system memory. It should also be noted that in the start step 200, the beginning of packet insertion operations can be detected by parsing the incoming bit stream. For example, the PVR can detect when control words must be inserted, key exchanges must be performed, or when another situation requiring a packet insertion occurs by parsing the incoming bit stream, or even when the system needs to provide extra security via introducing higher-frequently key exchanges to the incoming bit stream.

Figure 3:
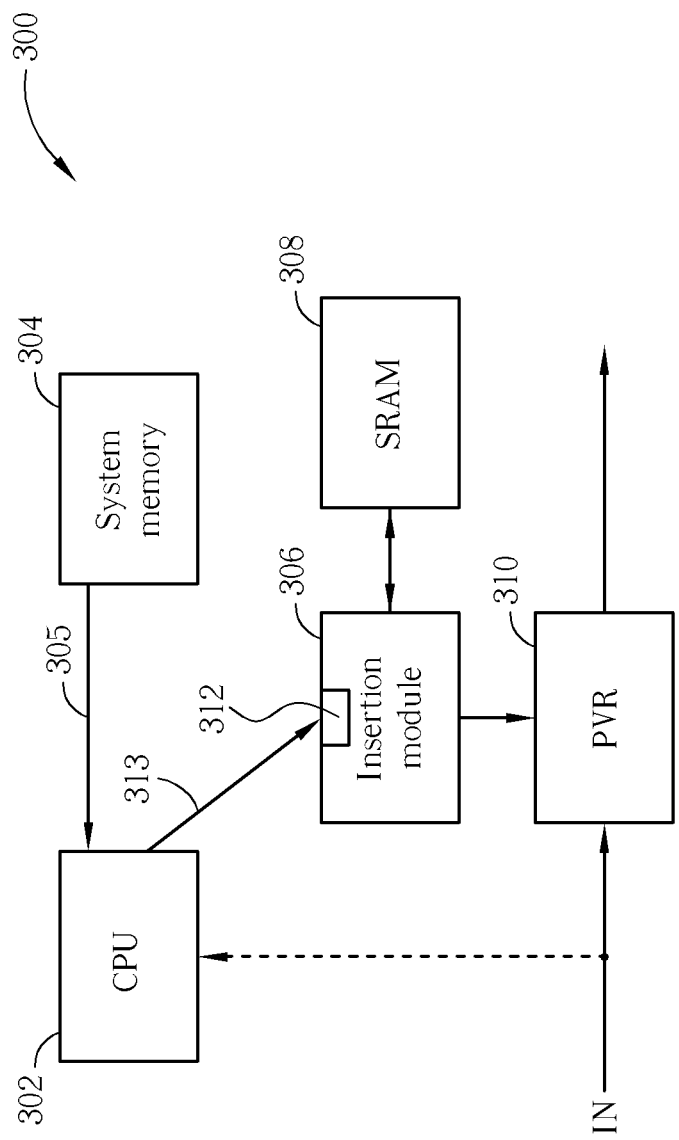
FIG. 3 is a block diagram of a packet insertion architecture according to an exemplary embodiment of the present invention.

FIG. 3 shows a block diagram of a packet insertion architecture 300 according to an exemplary embodiment of the present invention. As shown in FIG. 3, the packet insertion architecture 300 includes a central processing unit (CPU) 302, a system memory 304, an insertion module 306, a synchronous random access memory (SRAM) 308, and a PVR module 310. In this embodiment, the SRAM 308 is used to store a register file, and the insertion module 306 further includes a command bus access unit 312. Packet insertion in this exemplary embodiment of the present invention is performed according to the steps of the flowchart in FIG. 2.

Firstly, the CPU 302 parses the incoming bit stream IN to determined when to start packet insertion operations (step 200). As mentioned above, packet insertion operations may be required if a PVR needs to insert control words or perform a key exchange. Next, the CPU 302 reads data related to packet insertion from the system memory 304 using a system memory bus 305 (step 202). The CPU 302 processes the data read from the system memory 304 to generate packet insertion information (step 204). The packet insertion information is directly transferred to the insertion module 306 using a command bus 313 (step 206). The command bus access unit 312 of the insertion module 306 directly receives the packet insertion information. Finally, the insertion module 306 inserts a packet into the PVR bit stream (step 208) via the PVR module 310 to complete the packet insertion operation (step 210).

Because the command bus access unit 312 of the insertion module 306 directly receives the packet insertion information, the packet insertion information is not needed to be stored in the system memory 304. Therefore, memory bandwidth requirements of the system memory 304 are reduced, and data access of the system memory 304 is improved according to the present invention. Additionally, it is not necessary to utilize a linked list to organize packet information in the system memory 304. Instead, the packet information is directly transferred to the insertion module 306. In this way, the insertion module 306 receives the required packet insertion information and does not need to perform a direct memory access (DMA) operation to retrieve data from the system memory 304.

The packet insertion in the present invention can also be trigged whenever the system needs to perform packet insertion. In addition to the above example, the usage of packet insertion can also be related to how the secure level is desired. By employing higher-frequently key exchanges or using multiple keys rather than single key, the security can be improved even more. Typically, the CPU 302 or a timer (not shown) will issue interrupts to trigger the insertion module 306 to insert a packet into the PVR bit stream.

Although this embodiment of the present invention has been explained using the central processing unit (CPU) 302, in another embodiment of the present invention, the CPU 302 is replaced by an application specific integrated circuit (ASIC) or an alternative processing unit to process the data read from the system memory 304 and thereby generate the packet insertion information.

The present invention provides a method and architecture for performing packet insertion in a personal video recorder (PVR) by directly transferring packet insertion information generated by a processing unit to an insertion module without storing the packet insertion information in a system memory. Therefore, memory bandwidth requirements of the system memory are reduced according to the present invention. Additionally, it is neither necessary to utilize a linked list to organize packet information in the system memory nor perform a direct memory access (DMA) operation to retrieve data from the system memory. The PVR system implementation is therefore simplified, and data access of the system memory is improved according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of packet insertion in a personal video recorder (PVR) system, the method comprising the following steps:

reading data related to packet insertion from a system memory;

processing the data read from the system memory;

generating packet insertion information by a processing unit;

directly transferring the packet insertion information from the processing unit to an insertion module without storing the packet insertion information into the system memory;

and inserting a packet into a PVR bit stream by the insertion module according to the packet insertion information;

further comprising detecting the start of packet insertion operations by parsing the PVR bit stream;

wherein the start of packet insertion operations is triggered by an interrupt;

wherein the packet to be inserted carries information regarding key exchange;

further comprising: providing a command bus access unit in the insertion module; and utilizing a command bus to directly transfer the packet insertion information to the command bus access unit of the insertion module;

wherein the insertion module retrieves the packet insertion information without utilizing a linked list.

2. The method of claim 1, wherein the packet to be inserted carries at least one key value for key exchange.

3. A personal video recorder (PVR) system comprising:

a processing unit;

a system memory coupled to the processing unit by a system memory bus;

and an insertion module being coupled to the processing unit for inserting a packet into a PVR bit stream according to packet insertion information wherein during a packet insertion operation, the processing unit is used for reading data from the system memory, processing the data to generate the packet insertion information;

and directly transferring the packet insertion information to the insertion module without storing the packet insertion information into the system memory;

wherein during the packet insertion operation, the processing unit is further for detecting the start of packet insertion operations by parsing the PVR bit stream;

wherein the start of packet insertion operations is triggered by an interrupt;

wherein the packet to be inserted carries information regarding key exchange;

wherein the insertion module comprises a command bus access unit; the processing unit directly transfers the packet insertion information to the command bus access unit of the insertion module by a command bus;

wherein the insertion module retrieves the packet insertion information without utilizing a linked list.

4. The PVR system of claim 3, wherein the packet to be inserted carried at least one key value for key exchange.

* * * * *